United States Patent [19]

McDaniel et al.

[11] 4,299,731

[45] Nov. 10, 1981

[54] LARGE PORE VOLUME OLEFIN POLYMERIZATION CATALYSTS

[75] Inventors: Max P. McDaniel, Bartlesville, Okla.; John J. Meister, Gainesville, Fla.

[73] Assignee: Phillips Petroleum Company, Bartlesville, Okla.

[21] Appl. No.: 118,837

[22] Filed: Feb. 6, 1980

[51] Int. Cl.³ .................... B01J 21/08; B01J 23/26
[52] U.S. Cl. ............................. 252/451; 252/458; 423/338; 526/106
[58] Field of Search ............... 252/451, 458; 423/338; 526/106

[56] References Cited

U.S. PATENT DOCUMENTS

| | | | |
|---|---|---|---|
| 3,243,262 | 3/1966 | Carr et al. | 423/338 |
| 3,363,979 | 1/1968 | Schwartz et al. | 423/338 |
| 3,526,603 | 9/1970 | Acker | 252/451 |
| 4,042,770 | 8/1977 | Bachl et al. | 526/106 |
| 4,151,122 | 4/1979 | McDaniel et al. | 252/458 |

*Primary Examiner*—Carl F. Dees

[57] ABSTRACT

Large pore volume ($\geq 1.4$ cc/g) silica is obtained by slowly drying an acidic (pH $\leq 3.5$) silica hydrogel. The gel is useful in connection with chromium as an ethylene polymerization catalyst.

10 Claims, No Drawings

LARGE PORE VOLUME OLEFIN POLYMERIZATION CATALYSTS

The present invention relates to the polymerization of olefins. More specifically the present invention relates to a supported chromium catalyst comprising a large pore volume silica support. In accordance with another aspect this invention relates to a process to produce such a catalyst.

BACKGROUND OF THE INVENTION

One of the most important processes for the production of high density polyethylene is a catalytic polymerization process utilizing supported chromium catalysts. Many variations and modifications of the basic process have been made over the years. There is a continuing need for designing specific catalysts on the basis of chromium which allow the production of polymers with predictable properties and which allow the control of such properties.

THE INVENTION

One object of this invention is to provide a polymerization catalyst of controlled pore volume.

Another object of this invention is to provide a large pore volume silica for olefin polymerization catalysts enabling the control of the melt index and molecular weight distribution.

A further object of this invention is to provide a process for producing a silica xerogel or respectively an olefin polymerization catalyst comprising such a xerogel as the support, which xerogel has a high pore volume.

In accordance with this invention it has been found that by drying a silica-containing hydrogel having a low pH a large pore volume xerogel can be produced.

In accordance with a first embodiment of this invention a process to produce an olefin polymerization catalyst is therefore provided. This process comprises drying a silica-containing hydrogel having a pH of 3.5 or less to obtain a xerogel with large pore volume. Prior to, during, or after this drying step a chromium source is utilized to obtain a chromium-containing gel and a chromium-containing xerogel is the product of the process.

A significant and preferred feature of this invention resides in the fact that the step of drying the low pH hydrogel is carried out very slowly. This slow drying step appears to be of significant influence on the stability of the silica walls that maintain the large pore size preventing the premature collapse of these pores. The drying is preferably carried out slowly and relatively continuously over a period of time of approximately 2 to 50 hours.

Under the preferred conditions for the slow drying the hydrogel-acid mixture is kept at a temperature ranging from about 90° to about 110° C. at atmospheric pressure until essentially all the water is evaporated. Thereafter the temperature can be increased to the calcination temperatures employed in activation if desired, e.g. 500° C. Drying times at atmospheric pressure can range from about 2 to about 50 hours, preferably from 5 to 20 hours. If lower or higher pressures are employed during the slow drying the temperature used will be similarly near the boiling point of water under the pressure chosen.

In accordance with another embodiment of this invention a polymerization catalyst of the supported chromium type is provided. In accordance with this invention the silica xerogel support has a pore volume of above about 1.4 cc/g as determined by the Innes method. The preferred catalysts of this invention are those obtained by the process defined above and in the following claims.

Yet another embodiment of this invention resides in a polymerization process wherein one or more olefins are contacted under polymerization conditions with a catalyst as defined. The preferred process uses ethylene or ethylene together with one or more 1-olefins as the monomers for the polymerization step.

The process involves contacting the purified silica hydrogel with acid of inorganic or organic nature sufficient to impart to the mixture a pH ranging from about 0 to about 3.5, more preferably from about 0 to 3. The mixture is then slowly dried in an air oven, e.g. under a radiant heat source to obtain the large pore volume gels characteristic of the instant invention.

The gels in combination with chromium compounds are subjected to (a) calcination of the mixtures at an elevated temperature in the presence of molecular oxygen or (b) sequential calcination of the mixtures at an elevated temperature in a reducing ambient, e.g., carbon monoxide, followed by calcination in the presence of molecular oxygen. Thereby composites are produced which are active catalysts for ethylene polymerization. Calcination in an oxygen ambient is described in U.S. Pat. No. 2,825,721. Sequential calcination in a reducing ambient and an oxidizing ambient is disclosed in U.S. Pat. No. 4,151,122. These references are hereby incorporated into this application.

The silica hydrogels utilized in this invention are conventionally produced by contacting aqueous solutions of an alkali metal silicate, generally sodium silicate because of its ready availability and relatively low cost, and an acid, generally a mineral acid such as sulfuric acid although carbonic acid and organic acids such as acetic acid can also be employed. A minor amount of a water soluble compound selected from an element of Groups IIIA, IVB, VB, VIB, VIIB, and VIII of the Periodic Table of the Elements as disclosed in the Handbook of Chemistry and Physics, Chemical Rubber Company 45th Edition (1964) p. B-2, and mixtures thereof can also be present. The amount of such compounds present, when employed, can range from any finite amount up to about 20 weight percent (total) based on the dry composite with silica making up the balance. The resulting hydrogels are then aged, generally at from about 100° to about 200° F. (38°–93° C.) for about 1 to about 24 hours. The aged product is washed with water to reduce the alkali metal ion content to about 0.1 weight percent or less. The purified hydrogenl is then admixed with the acid to attain the specified pH range previously described and the mixture is slowly dried to obtain the gels of this invention.

It has been found with coprecipitated silica-containing hydrogels such as silica-titania cogel hydrogels which have larger pores and less mechanical resistance to shrinkage on drying than silica hydrogels that the effect of adding an acid to increase pore volume is reduced relative to the silica hydrogels. Thus, the maximum benefit achieved with increasing pore volumes is observed with silica hydrogels containing from about 99 to 100 weight percent silica on a dry basis.

In one embodiment, a high pore volume silica gel containing a chromium compound, for example, can be produced by admixing a purified, acid-containing silica hydrogel in the specified pH range with a water soluble chromium compound such as chromium(III)acetate, chromium(III)nitrate, chromium trioxide, and ammonium dichromate, and slowly drying the mixture. Alternately, the dry silica gel can be impregnated with a chromium compound such as chromium(II)acetylacetonate, t-butyl chromate, dicumylchromium, etc. dissolved in a nonaqueous solvent such as n-hexane, pyridine, acetone, and the like. Nonaqueous impregnation is required in this method to avoid destroying the large pore volume material which can occur in the presence of added water.

High pore volume silica gels in this invention are those essentially 1000% silica gels which have pore volumes ranging from about 1.45 to about 1.95 ml/g as determined with isopropanol according to the Innes method as described in Analytical Chemistry 28, 332–334 (1956). Prior to conducting the determinations the gels are calcined in air at about the same temperature, e.g., 500° C. Control gels produced from the same hydrogel without the acid treatment, in contrast, have pore volumes of about 1.33 ml/g.

Inorganic acids employable in this invention are those which are water soluble, sufficiently ionized to produce the pH level required in the hydrogels, and do not have a deleterious effect on the silicas or in the end use application. For the production of ethylene polymerization catalysts, specific but nonlimiting acids can be selected from among hydrochloric acid, hydrobromic acid, hydroiodic acid, nitric acid, sulfamic acid, sulfuric acid, orthophosphoric acid and iodic acid.

Organic acids generally employable in this invention are those which exhibit the same pH requirements as the inorganic acids. Specific but nonlimiting examples include acetic acid, formic acid, tartaric acid, citric acid, maleic acid, malic acid, malonic acid, succinic acid, gluconic acid, diglycolic acid, ascorbic acid, cyclopentane tetracarboxylic acid, and benzenesulfonic acid.

In general, those organic acids meeting the requirements of water solubility, stability, acid strength, non-deleterious action as described before also have pK values of about 4.76 or less as disclosed in Lange's Handbook of Chemistry, 11th Edition (1973), Tables 5-7, 5-8. In other words, their acid strength is equal to or greater than that of acetic acid.

Acids such as sulfuric acid and hydrochloric acid are generally preferred, however, because of their ready availability, relatively low cost, great acid strength, and efficacy in the process.

The ethylene polymers which can be produced with the invention catalysts are normally solid homopolymers, copolymers terpolymers, etc. of ethylene containing up to about 20 mole % (total) of comonomers selected from aliphatic 1-olefins having from 3 to about 10 carbon atoms and/or a conjugated diolefin having from 4 to about 12 carbon atoms. The polymers can be converted by conventional means into useful articles such as fibers, films, sheets and containers.

Polymerization processes with the invention catalysts can be conducted batchwise or continuously, and include gas phase, particle form and soluble form modes of operation. For reasons of economy, a presently preferred polymerization process is the particle form process described in U.S. Pat. No. 3,624,063. This patent, too, is incorporated herein by reference.

In such a polymerization process the olefin or mixture of olefins is polymerized at a temperature within the range from about 150°–230 ° F. (65°–110° C.) and a pressure within the range from about 110 to about 700 psia (0.75–4.8 MPa) or higher. Catalyst concentrations generally can range from about 0.001 to about 1 weight percent chromium based on the weight of reactor contents. The catalyst is kept in suspension and is contacted with the monomer(s) in an organic medium inert in the process at a pressure sufficient to maintain the medium and at least a portion of the monomer(s) in the liquid phase. The organic medium and the reaction temperature are selected such that the polymer is produced as solid, discrete particles and is recovered in that form. The organic medium employed is generally a paraffin and/or cycloparaffin having from 3 to 12 carbon atoms per molecule. Representative examples includes propane, n-butane, isobutane, pentane, isopentane, n-dodecane, cyclohexane, methylcyclohexane, and the like.

If desired, hydrogen can be employed in the polymerization process to regulate or decrease the molecular weight of the polymers produced with the invention catalysts, e.g., give higher melt index products as determined in accordance with the procedure of ASTM D 1238-65T, condition E. When hydrogen is used its partial pressure can range from about 20 to about 120 psi (0.14–0.83 MPa).

High pore volume of the catalyst support is generally considered desirable in ethylene polymerization catalysts based on silica-supported chromium oxide since the ability of the catalysts to produce polymers with high melt index, particularly in a particle form polymerizatin process, in partly dependent upon attaining high pore volumes. As a general proposition, the melt index of ethylene polymers produced with these catalysts is also related to the polymerization temperature, the higher the temperature the higher the melt index. In a particle form process, however, a relatively low maximum reaction temperature is used, otherwise polymer can go into solution and its recovery becomes time consuming and expensive. The relatively between catalyst pore volume and polymer melt index is detailed in U.S. Pat. No. 4,169,926.

The following examples are intended to further illustrate the invention and show some preferred details but are not intended to unduly limit the scope thereof.

EXAMPLE I

A sample of commercially available, purified silica hydrogel containing about 28 weight percent solids was diluted with sufficient water to produce a hydrogel slurry masterbatch containing about 20 weight percent solids. The pH of the masterbatch was essentially neutral, e.g., 6 to 8. In general, an 80 ml (104 g) portion of the hydrogel contained in an open mouth jar was admixed with the specified acid or base, if used. Each jar was then placed in a vacuum oven set at 150° C. and a pressure of about 10 to 15 inches Hg (34–51 kPa) where it remained overnight (about 15 hours) for slow drying. The dried samples were removed, individually ground until each passed through a 50 mesh screen (U.S. Sieve Series) and the ground material calcined in air at 500° C. for about 16 hours. Pore volumes were determined from samples of the recovered, calcined products according to the Innes method using isopropanol.

In one series of runs the effect of pH level of the silica hydrogel on pore volume of the subsequently dried and calcined gels obtained from each sample was determined.

In a second series of runs the effect of sulfuric acid concentration of the silica hydrogel on pore volumes of subsequently dried and calcined gels made from each sample was determined.

In a third series of runs the effect of various acids individually used in the silica hydrogel on pore volumes of subsequently dried and calcined gels produced from each sample was determined.

In a fourth series of runs the effect of various organic acids individually used in the silica hydrogel on pore volumes of subsequently slowly dried and calcined gels prepared from each sample was determined. The acids dissolved unless noted to the contrary. The specific additive(s) used in each run and concentration thereof and pore volume results are given in Tables 1A, 1B, 1C and 1D.

weight percent solids, said hydrogels exhibiting a moderately acidic pH of about 2 prior to drying them conventionally in an air oven. The presence of the acid reduces shrinkage of the hydrogel as it dries in the presence of water and acid.

It is disclosed in U.S. Pat. No. 4,169,926 that ethylene polymerization catalysts consisting of chromium oxide supported on silica yield polymers, in a particle form polymerization process, which show increasing melt index values as the pore volume of the support increases. Thus, ethylene polymerization catalysts comprising chromium oxide supported on the improved silica gels of the instant invention will exhibit greater melt index capability than catalysts derived from the control silica gels.

TABLE 1B

Effect Of $H_2SO_4$ Concentration On Silica Gel Pore Volume

| Run No. | Con. $H_2SO_4$ Wt. gms[a] | Hydrogel Additive Wt. Ratio | pH | Pore Vol. g/ml | Improv. %[b] | Remarks |
|---|---|---|---|---|---|---|
| 1 | none | — | 6.8 | 1.33 | —[c] | control |
| 10 | 0.40 | 260 | 1.4 | 1.45 | 9 | invention |
| 8 | 0.67 | 155 | 2.2 | 1.50 | 13 | " |
| 9 | 0.92 | 113 | 1.8 | 1.88 | 41 | " |
| 11 | 1.8 | 58 | 1.5 | 1.79 | 35 | " |
| 12 | 1.8 (repeat) | 58 | 1.5 | 1.77 | 33 | " |
| 13 | 3.7 | 28 | 1.2 | 1.74 | 31 | " |
| 14 | 5.5 | 19 | 1.0 | 1.72 | 29 | " |
| 15 | 9.2 | 11 | 0.8 | 1.66 | 25 | " |
| 16 | 18.4 | 6 | 0.3 | 1.63 | 23 | " |
| 17 | 1.8 (neutralize with NH4OH) | 58 | 7. | 1.39 | 5 | control |

[a]Calculated amount of 100% $H_2SO_4$ in the 96% acid used.
[b]Relative to baseline of 1.33 g/cc.
[c]A dash signifies no entry is needed.

TABLE 1A

Effect Of pH On Silica Gel Pore Volume

| Run No. | Hydrogel Add. Vol. Ratio | Hydrogel Additive | Hydrogel Add. Wt.[f] | pH | Pore Vol. g/ml | Improv.[a] % | Remarks |
|---|---|---|---|---|---|---|---|
| 1 | — | none | — | 6.8 | 1.33 | —[b] | control |
| 2 | — | " | — | " | 1.32 | — | " |
| 3 | — | " | — | " | 1.32 | — | " |
| 4 | — | " | — | " | 1.34 | — | " |
| 5 | 80 | Conc. NH4OH[c], 0.90g | 116 | 9 | 1.34 | — | " |
| 6 | 210 | NMe4OH,[d] 0.08g | 1300 | 9–10 (est.) | 1.32 | — | " |
| 7 | 80 | NMe4OH,[d] 0.2g | 520 | 9–10 (est.) | 1.29 | −3 | " |
| 8 | 210 | Conc. $H_2SO_4$[e], 0.67g | 155 | 2.2 | 1.50 | 13 | invention |
| 9 | 160 | Conc. $H_2SO_4$[e], 0.92g | 113 | 1.8 | 1.88 | 41 | " |

NOTES:
[a]Relative to baseline of 1.33 g/cc.
[b]A dash indicates no entry is needed.
[c]28% ammonium hydroxide.
[d]Tetramethylammonium hydroxide, 20 wt. % in water.
[e]96% sulfuric acid.
[f]The additive weights shown are calculated on the basis of 100% active component.

The results presented in Table 1A in control runs 1–4 show that silica hydrogels at an initially neutral pH when oven dried yield silica gels having a relatively low pore volume of about 1.3 g/cc. Control runs 5–7, show similar results for silica gels produced from the hydrogels at a moderately basic, initial pH level of about 9 to about 10. However, invention runs 8–9 show that silica hydrogels slowly dried at a moderately acidic, initial pH value of about 2 yield silica gels having substantially improved pore volumes. Invention run 8 shows a pore volume of 1.50 g/cc for the silica gel relative to the control gel pore volume of 1.33 g/cc (13% improvement) and the gel of invention run 9 shows a pore volume of 1.88 g/cc (41% improvement) relative to the control gel.

The data in Table 1A demonstrate that silica gels having increased pore volumes are produced from the corresponding silica hydrogels containing about 20

TABLE 1C

Effect Of Various Acids On Silica Gel Pore Volume

| Run No. | Acid Employed | Hydrogel Additive Wt. Ratio | pH | Volume Pore g/ml | Improv. %[a] | Remarks |
|---|---|---|---|---|---|---|
| 1 | none | — | 6.8 | 1.33 | —[f] | control |
| 18 | Con. HCl[b], 0.38g | 274 | 1.1 | 1.45 | 9 | invention |
| 19 | Con. HCl[b], 0.43g | 242 | 1.0 | 1.83 | 38 | " |
| 20 | Con. HCl[b], 0.86g | 121 | 1.0 | 1.83 | 38 | " |
| 21 | Con. H$_3$PO$_4$[c], 1.4g | 74 | 1.7 | 1.70 | 28 | " |
| 22 | Sulfamic, 1.0g | 104 | 1.5 (calc) | 1.80 | 35 | " |
| 23 | Con. HNO$_3$[d], 0.9g | 116 | 1.3 | 1.88 | 41 | " |
| 24 | Glacial acetic acid, 2.1g | 50 | 3.3 (calc) | 1.62 (1.70)[e] | 22 28 | " |

NOTES:
[a] Relative to baseline of 1.33 g/cc.
[b] 36% HCl
[c] 85% H$_3$PO$_4$
[d] 69.5% HNO$_3$
[e] Repeat determination.
[f] A dash signified no entry is needed.

TABLE 1D

Effect of Assorted Acids on Silica Gel Pore Volume

| Run No. | Acid Employed Wt. gms. | Hydrogel Additive Wt. Ratio | Pore Vol. g/cc | Improv. %[a] | Remarks |
|---|---|---|---|---|---|
| 1 | none | — | 1.33 | —[e] | control |
| 25 | citric, 2 | 52 | 1.70 | 28 | invention |
| 26 | [b]CPTA, 2 | 52 | 1.72 | 29 | " |
| 27 | ascorbic, 2 | 52 | 1.67 | 26 | " |
| 28 | malic, 2 | 52 | 1.74 | 31 | " |
| 29 | succinic, 2 | 52 | 1.79 | 35 | " |
| 30 | gluconic, 2 | 52 | 1.61 | 21 | " |
| 31 | diglycolic, 2 | 52 | 1.73 | 30 | " |
| 32 | add NH$_4$OH to 31 to pH 7 | — | 1.30 | −2 | control |
| 33 | add NH$_4$OH to 32 to pH basic | — | 1.33 | 0 | " |
| 34 | tartaric acid, 2 | 52 | 1.79 | 35 | invention |
| 35 | like 34 + 0.67g conc. H$_2$SO$_4$ | 40 | 1.83 | 38 | " |
| 24 | glacial acetic acid, 2.1 | 50 | 1.62 | 22 | " |
| 36 | like 24 + 0.67g conc. H$_2$SO$_4$ | 38 | 1.92 | 44 | " |
| 37 | [c]nitrilotriacetic, 2 | 52 | 1.75 | 32 | " |
| 38 | [d]add NH$_4$OH to 37 to basic pH | — | 1.32 | 0 | control |
| 39 | add H$_2$SO$_4$ to 38 to pH of 2 | — | 1.54 | 16 | invention |

NOTES:
[a] Relative to baseline of 1.33 g/cc
[b] cyclopentane tetracarboxylic acid
[c] the acid, N(CH$_2$COOH)$_3$, apparently did not dissolve, nevertheless it improved pore volume
[d] the nitrilotriacetic acid dissolved
[e] A dash signified no entry is needed.

The results presented in Table 1B in invention runs 8–16 show the relationship between hydrogel pH and pore volume of gels produced from the oven dried hydrogels. In these runs, the pH of the hydrogel samples ranged from 0.3 to 2.2. The gel with the highest pore volume had an initial pH of 1.8. A pH levels of about 1.8 or greater for the hydrogels, the pore volumes of the oven dried gels rapidly declined. At pH levels of from about 1.8 to about 0.3 for the hydrogels, the pore volumes of the oven dried gels slowly decrease from about 1.9 to about 1.6.

In control run 17 of Table 1B, the results indicate that pore volume increase is related to the hydrogel pH level and not to the presence of the sulfate anion. The hydrogel is first acidified with concentrated H$_2$SO$_4$ to a pH value of about 1.5 as shown in runs 11, 12 and then the mixture is neutralized with ammonia so that the sulfate anion remained in solution. Silica gel produced from the oven dried hydrogel is shown to have a pore volume increase of only about 5%. The low pore volume of the gel indicates that the pore volume increase is pH related and is reversible.

The results given in Table 1C demonstrate the effect of various acids on the pore volume increase of silica gels oven dried from the corresponding hydrogels. The results show that strong acids such as HCl, HNO$_3$, H$_3$PO$_4$ and sulfamic acid all greatly increase the pore volume of the gels oven dried from the acidified hydrogels. In run 24, a weak acid such as acetic acid also is effective.

The results given in Table 1D demonstrate that a variety of organic acids are effective in silica hydrogels. Such mixtures when oven dried yield gels which exhibit substantially larger pore volumes than untreated hydrogels. Controls runs 32, 33 (compare with invention run 31) and control run 38 (compare with invention runs 37, 39) again demonstrate the effect of pH and show that it is reversible.

All of the acids employed are water soluble except nitrilotriacetic (run 37) which apparently did not dissolve. Yet, the gel produced in run 37 has an increased pore volume 32% better than the control. The reason for the behavior of the acid is not understood at this time.

The hydrogel: additive(s) weight ratio can vary widely depending upon the nature of the additive. With strong acids the weight ratio can range from about 5 l to about 275. With weak acids it can range from about 5 to about 60 or higher.

EXAMPLE 2

Individual 100 gram portions of a silica-titania cogel hydrogel containing 14 weight percent solids and 2 weight percent titanium as titania based on the dry cogel were pushed through a 15 mesh screen and each sample slurried with 100 ml of water. The cogel hydrogel was prepared as disclosed in U.S. Pat. No. 3,870,656. Each sample, after treatment, if used, was dried, calcined, and pore volume measured as described in Example 1.

The results are presented in Table 2.

TABLE 2

Effect Of Acid On Pore Volume Of Silica-Titania Cogel

| Run No. | Acid Employed Formula | g | ml | Hydrogel Acid Wt. Ratio | Approx. pH Calc. | Pore Vol. g/cc | Improv. % | Remarks |
|---|---|---|---|---|---|---|---|---|
| 40 | $H_2SO_4$ | 0.92 | 0.5 | 435 | 1.8 | 0.95 | 9 | invention |
| 41 | —(a) | 0 | 0 | — | 7 | 0.87 | — | control |

(a)A dash signifies no entry is needed.

The data presented in Table 2 indicate that some improvement is obtained by treating silica cogel hydrogels with acids. The difference in behavior between silica cogel hydrogels and silica hydrogels as far as acid treating goes is believed to be inherent to the gel. That is, silica hydrogels can be prepared containing up to about 30 weight percent solids whereas silica cogel hydrogels can contain up to about 14 weight percent solids. Thus, the cogel hydrogel structure (primary particles) possesses larger pores, less mechanical resistance to shrink during drying, and possibly the repulsion of the primary particles due to charge buildup during acidifying is lessened relative to silica hydrogel.

Reasonable variations and modifications which will become apparent to those skilled in the art can be made in this invention without departing from the spirit and scope thereof.

We claim:

1. A process to produce an olefin polymerization catalyst comprising:
   (a) contacting an aqueous alkali metal silicate comprising solution with an acid to produce an alkali-containing hydrogel,
   (b) removing alkali from said alkali-containing hydrogel by washing with water to obtain a purified silica-containing hydrogel,
   (c) admixing the so obtained purified silica-containing hydrogel with acid to obtain an acidified silica-containing hydrogel having a pH of 3.5 or less,
   (d) maintaining said acidified silica-containing hydrogel at a temperature near the boiling point of water at the drying pressure until essentially all water is evaporated
   (e) prior to, during or after said drying utilizing a chromium source to obtain a chromium-containing gel,
   (f) recovering a chromium-containing xerogel as the product of the process.

2. A process in accordance with claim 1 comprising:
   (a) reacting alkali metal silicates and a strong acid to produce an alkali ions-containing hydrogel,
   (b) washing said alkali ions-containing hydrogel to remove essentially all of the alkali ions to produce a purified hydrogel,
   (c) mixing said purified hydrogel and an acid to produce an acidic hydrogel,
   (d) drying said acidic hydrogel.

3. A process in accordance with claim 2 comprising aging said purified hydrogel prior to the mixing of said purified hydrogel with said acid.

4. A process in accordance with claim 1 comprising slowly drying said silica-containing hydrogel.

5. A process in accordance with claim 4 comprising dissolving said chromium compound in said acid and mixing the solution so obtained and said purified hydrogel.

6. A process in accordance with claim 1 comprising mixing said large pore volume xerogel and a solution of a chromium compound in an inert organic solvent and removing said solvent to obtain said chromium-containing xerogel.

7. A process in accordance with claim 1 wherein said silica-containing hydrogel consists essentially of silica.

8. A supported chromium polymerization catalyst produced by the process of claim 1 the support of which comprises silica xerogel having a pore volume of above about 1.4 cc/g.

9. A process in accordance with claim 1 wherein said step (b) is carried out under a radiant heat source or in a drying vacuum oven.

10. Process of claim 1 wherein said acid used in step (c) is an organic acid.

* * * * *

UNITED STATES PATENT AND TRADEMARK OFFICE
CERTIFICATE OF CORRECTION

PATENT NO. : 4,299,731

DATED : November 10, 1981

INVENTOR(S) : Max P. McDaniel; John J. Meister

It is certified that error appears in the above—identified patent and that said Letters Patent are hereby corrected as shown below:

Claim 2, column 10, line 17, "silicates" should be --- silicate ---.

Signed and Sealed this

Twenty-third Day of February 1982

[SEAL]

Attest:

Attesting Officer

GERALD J. MOSSINGHOFF

Commissioner of Patents and Trademarks